US012068917B2

(12) United States Patent
Joseph et al.

(10) Patent No.: US 12,068,917 B2
(45) Date of Patent: *Aug. 20, 2024

(54) CONFIGURATION OF A NETWORK USING A FLEX-ALGORITHM ROUTING MECHANISM (71) Applicant: Juniper Networks, Inc., Sunnyvale, CA (US)

(72) Inventors: William Britto Arimboor Joseph, Bangalore (IN); Ronald Bonica, Sterling, VA (US); Shraddha Hegde, Bangalore (IN); Parag Kaneriya, Bengaluru (IN); Rajesh Shetty Manur, Bengaluru (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/306,568

(22) Filed: Apr. 25, 2023

(65) Prior Publication Data
US 2023/0261941 A1 Aug. 17, 2023

Related U.S. Application Data (63) Continuation of application No. 17/211,239, filed on Mar. 24, 2021, now Pat. No. 11,671,322.

(30) Foreign Application Priority Data

Aug. 19, 2020 (IN) .............................. 202041035725

(51) Int. Cl.
H04L 41/0826 (2022.01)
H04L 45/02 (2022.01)
H04L 45/12 (2022.01)

(52) U.S. Cl.
CPC .......... H04L 41/0826 (2013.01); H04L 45/02 (2013.01); H04L 45/124 (2013.01)

(58) Field of Classification Search
None
See application file for complete search history.

(56) References Cited

U.S. PATENT DOCUMENTS 10,764,175 B1  9/2020  Filsfils et al.
11,558,784 B2  1/2023  Hu et al.
(Continued)

FOREIGN PATENT DOCUMENTS

CN  110535766 A  12/2019
CN  111147373 A  5/2020

OTHER PUBLICATIONS

Britto W., et al., "IGP Flexible Algorithms (Fiexalgo) In IP Networks; draft-bonica-lsr-ip-flexalgo-00.txt," LSR Working Group Internet-Draft, Internet Engineering Task, IETF, Sep. 29, 2020, pp. 1-14, XP015141876, Retrieved from the Internet: [URL: https://tools.ietf.org/html/draft-bonica-lsr-ip-flexalgo-00][Retrieved on Sep. 29, 2020].

(Continued)

Primary Examiner — Otis L Thompson, Jr.
(74) Attorney, Agent, or Firm — Harrity & Harrity, LLP (57) ABSTRACT In some implementations, a first network device may receive an advertisement from a second network device. The advertisement may be associated with indicating that the second network device is configured to support a particular flex-algorithm. The first network device may identify, in the advertisement, an address of the second network device. The first network device may configure a routing table of the first network device to indicate that the second network device is capable of receiving traffic associated with the particular flex-algorithm based on the address. The first network device may perform, using the routing table, an action (Continued)

associated with routing the traffic associated with the particular flex-algorithm.

20 Claims, 8 Drawing Sheets (56) References Cited

U.S. PATENT DOCUMENTS

| | | | |
|---|---|---|---|
| 11,799,772 B2* | 10/2023 | Drake | H04L 45/02 |
| 2015/0071286 A1* | 3/2015 | de Silva | H04L 12/4641 |
| | | | 370/392 |
| 2015/0180722 A1* | 6/2015 | Kapadia | H04L 41/0803 |
| | | | 370/401 |
| 2019/0288940 A1* | 9/2019 | Filsfils | H04L 45/74 |
| 2020/0008067 A1* | 1/2020 | Filsfils | H04L 47/825 |
| 2020/0127913 A1* | 4/2020 | Filsfils | H04L 45/741 |
| 2020/0145319 A1 | 5/2020 | Joseph et al. | |
| 2020/0244588 A1* | 7/2020 | Filsfils | H04L 41/12 |
| 2020/0322254 A1* | 10/2020 | Psenak | H04L 63/205 |
| 2021/0084009 A1 | 3/2021 | Du et al. | |
| 2022/0006721 A1* | 1/2022 | Negi | H04L 45/04 |
| 2022/0038364 A1* | 2/2022 | Du | H04L 45/34 |
| 2022/0060380 A1 | 2/2022 | Joseph et al. | |
| 2022/0200893 A1* | 6/2022 | Yao | H04L 41/5054 |
| 2023/0007568 A1 | 1/2023 | Shetty et al. | |
| 2024/0024691 A1* | 1/2024 | Schwarz | A61N 1/3603 |

OTHER PUBLICATIONS

Extended European Search Report for Application No. EP21172927. 2, mailed on Oct. 29, 2021, 16 pages.

Psenak P., et al., "IGP Flexible Algorithm draft-ietf-lsr-flex-algo-09.txt," Network Working Group Internet-Draft, Internet EngineeringTask Force, IETF, Aug. 14, 2020, pp. 1-36, XP015141109, Retrieved from the Internet: [URL: https://tools.ietf.org/html/draft-ietf-lsr-flex-algo-09][Retrieved on Aug. 14, 2020].

Shaofu P., et al., "Algorithm Related IGP-Adjacency SID Advertisement," draft-peng-lsr-algorithm-related-adjacency-sid-00, Internet Engineering Task Force (IETF), Mar. 9, 2020, 9 pages.

Talaulikar K., et al., "BGP Link-State Extensions for BGP-only Fabric; draft-ketant-idr-bgp-ls-bgp-only-fabric-02.txt," Inter-DomainRouting Internet-Draft, Internet Engineering Task Force, IETF, Mar. 9, 2019, pp. 1-25, XP015131670, Retrieved from the Internet: [URL: https://tools.ietf.org/html/draft-ketant-idr-bgp-ls-bgp-onlyfabric-02][Retrieved on Mar. 10, 2019].

* cited by examiner

CONFIGURATION OF A NETWORK USING A FLEX-ALGORITHM ROUTING MECHANISM

CROSS-REFERENCE TO RELATED APPLICATIONS

This application is a continuation of U.S. patent application Ser. No. 17/211,239, filed Mar. 24, 2021, which claims priority to India Provisional Application No. 202041035725, entitled "CONFIGURATION OF A NETWORK USING A FLEX-ALGORITHM ROUTING MECHANISM," and filed on Aug. 19, 2020, the contents of which are incorporated herein by reference in their entireties.

BACKGROUND

In segment routing, traffic is communicated through a network via a segment routing path. The segment routing path is an ordered list of segments that connect a source (e.g., an ingress node of the network) and a destination (e.g., an egress node of the network). An individual segment of the list of segments (referred to as a "prefix segment") follows a least-cost path from a source of the prefix segment to a destination of the prefix segment.

SUMMARY

In some implementations, a method comprises receiving, by a first network device, an advertisement from a second network device, wherein the advertisement is associated with indicating that the second network device is configured to support a particular flex-algorithm; identifying, by the first network device and in the advertisement, an address of the second network device; configuring, by the first network device, a routing table of the first network device to indicate that the second network device is capable of receiving traffic associated with the particular flex-algorithm based on the address; and performing, by the first network device and using the routing table, an action associated with routing the traffic associated with the particular flex-algorithm.

In some implementations, a network device includes one or more memories and one or more processors to receive, via a non-segment-routing network, information associated with a flexible algorithm; associate a loopback address with the flexible algorithm based on receiving the information associated with the flexible algorithm; provide, to one or more other network devices included in the non-segment-routing network, information indicating that the loopback address is associated with the flexible algorithm; and receive network traffic associated with the flexible algorithm based on providing the information indicating that the loopback address is associated with the flexible algorithm to the one or more other network devices.

In some implementations, a non-transitory computer-readable medium storing a set of instructions includes one or more instructions that, when executed by one or more processors of a first network device, cause the first network device to receive an advertisement from a second network device, wherein the advertisement is associated with indicating that the second network device is configured to support a particular flex-algorithm; identify, in the advertisement, an address of the second network device; configure a routing table of the first network device to indicate that the second network device is capable of receiving traffic associated with the particular flex-algorithm based on the address; and perform, using the routing table, an action associated with routing the traffic associated with the particular flex-algorithm.

DETAILED DESCRIPTION

The following detailed description of example implementations refers to the accompanying drawings. The same reference numbers in different drawings may identify the same or similar elements.

A network that uses segment routing may utilize a routing protocol (e.g., an Intradomain Gateway Protocol (IGP)) to calculate and/or identify a least-cost path for transmitting traffic via the network. Segment routing may enable multiple prefix segments, ending at a same destination, to be configured in the network.

A flex-algorithm may be used in segment routing to influence how the routing protocol calculates the least-cost path for each prefix segment. For example, nodes (e.g., network devices) included in a segment routing network may indicate a flex-algorithm with a prefix segment identifier (SID) (e.g., for segment routing multiprotocol label switching (SR-MPLS)) or may indicate the flex-algorithm with a flex-algorithm locator (e.g., an SRv6 locator). A set of prefix SIDs and/or flex-algorithm locators may then represent a segment routing path that is computed according to the identified flex-algorithm. However, some networks are not configured for segment routing and, therefore, may not enable use of a flex-algorithm.

Some implementations described herein enable use of flex-algorithms in networks that do not use segment routing (referred to herein as "non-segment-routing networks"). For example, as described herein, a network device that is configured to route traffic according to a flex-algorithm definition (e.g., a flex-algorithm that is defined by a particular set of parameters, constraints, and/or the like) may advertise, to other network devices of the non-segment-routing network (e.g., neighbor network devices and/or other peer network devices of the network), an identifier for the flex-algorithm definition (referred to herein as a "Flex-Algo ID") and a specific address (e.g., a secondary address, a loopback address, and/or the like) of the network device that is designated to receive traffic associated with the flex-algorithm definition. Further, if a network device is configured to use multiple flex-algorithms, the network device may associate each of the multiple flex-algorithms with a respective address (e.g., each flex-algorithm may be mapped to a unique loopback address of the network device).

As described herein, for a particular flex-algorithm definition, the network devices (e.g., all network devices and/or a plurality of network devices) of the non-segment-routing network may calculate a least-cost path (e.g., according to the IGP) for transmitting traffic, associated with the flex-algorithm definition, between a source device and a destination device of the non-segment-routing network. The least-cost path may be determined based on costs calculated for links to addresses (e.g., of peer network devices), according to the flex-algorithm definition, that have been advertised for use with the flex-algorithm definition.

In this way, as the network devices of the non-segment-routing network advertise, to other network devices, corresponding addresses for flex-algorithms that the network devices are configured to support to calculate costs, the network devices may select and/or identify route paths for the flex-algorithms based on the addresses. Accordingly, network devices in a non-segment-routing network using a flex-algorithm, as described herein, may not need to analyze whether a segment of the network device satisfies the constraints of the flex-algorithm, because the network devices are only aware of links to addresses that are associated with the flex-algorithm. A route path, between a source device and a destination device, for a flex-algorithm may be configured using addresses of the network devices that use the flex-algorithm.

Figure 1A:
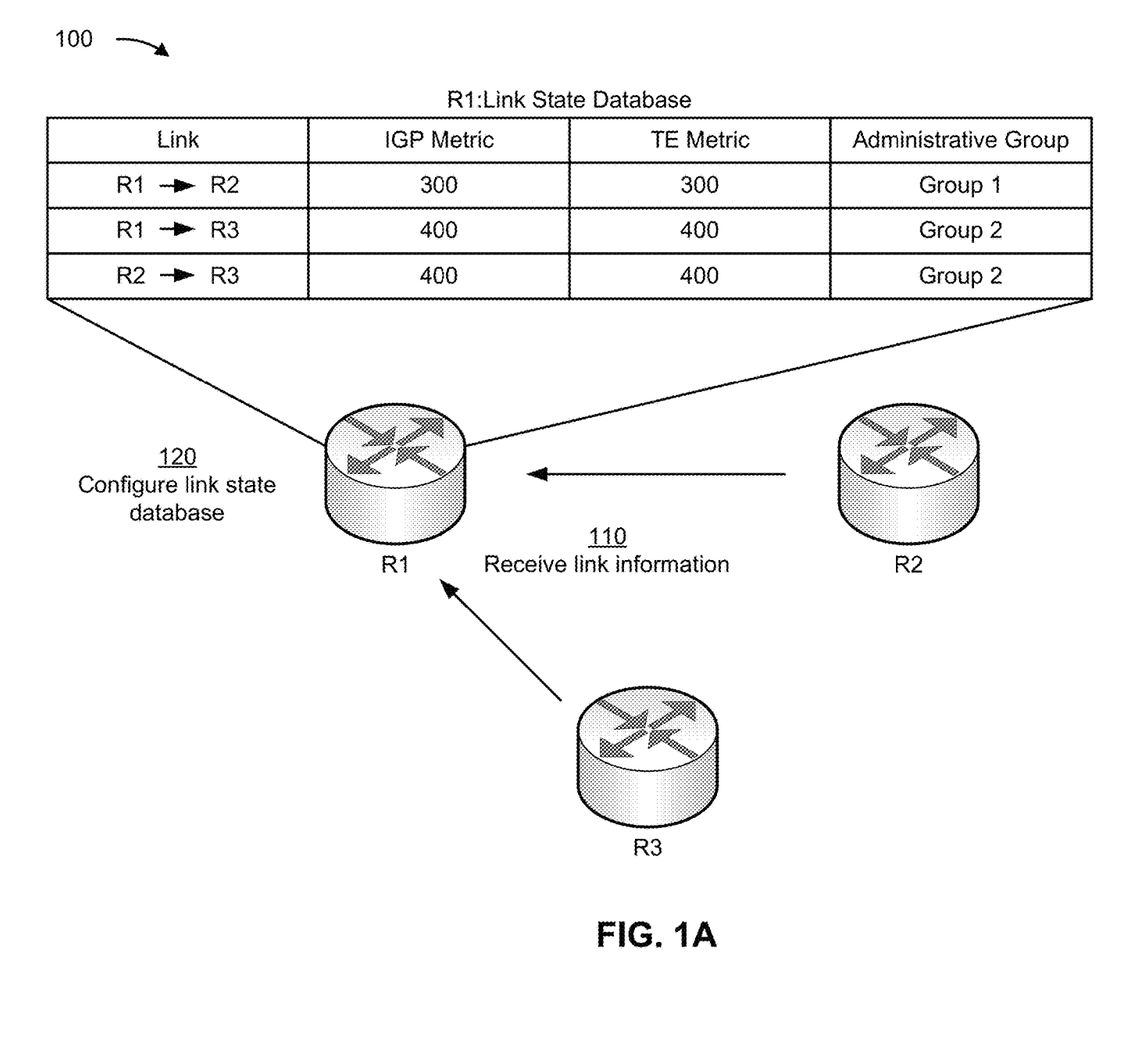
FIGS. 1A-1C are diagrams of an example implementation described herein.
Figure 1B:
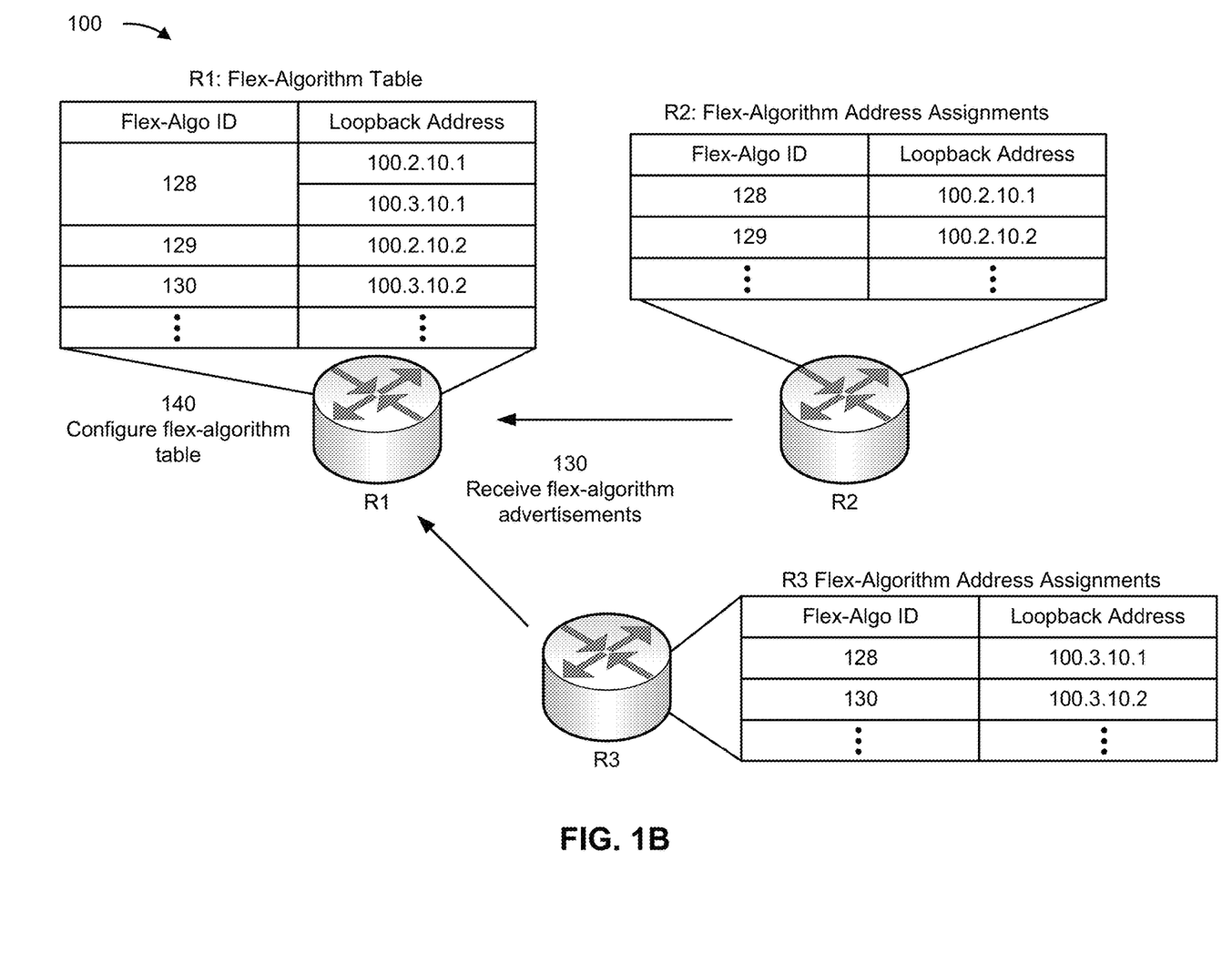
Figure 1C:
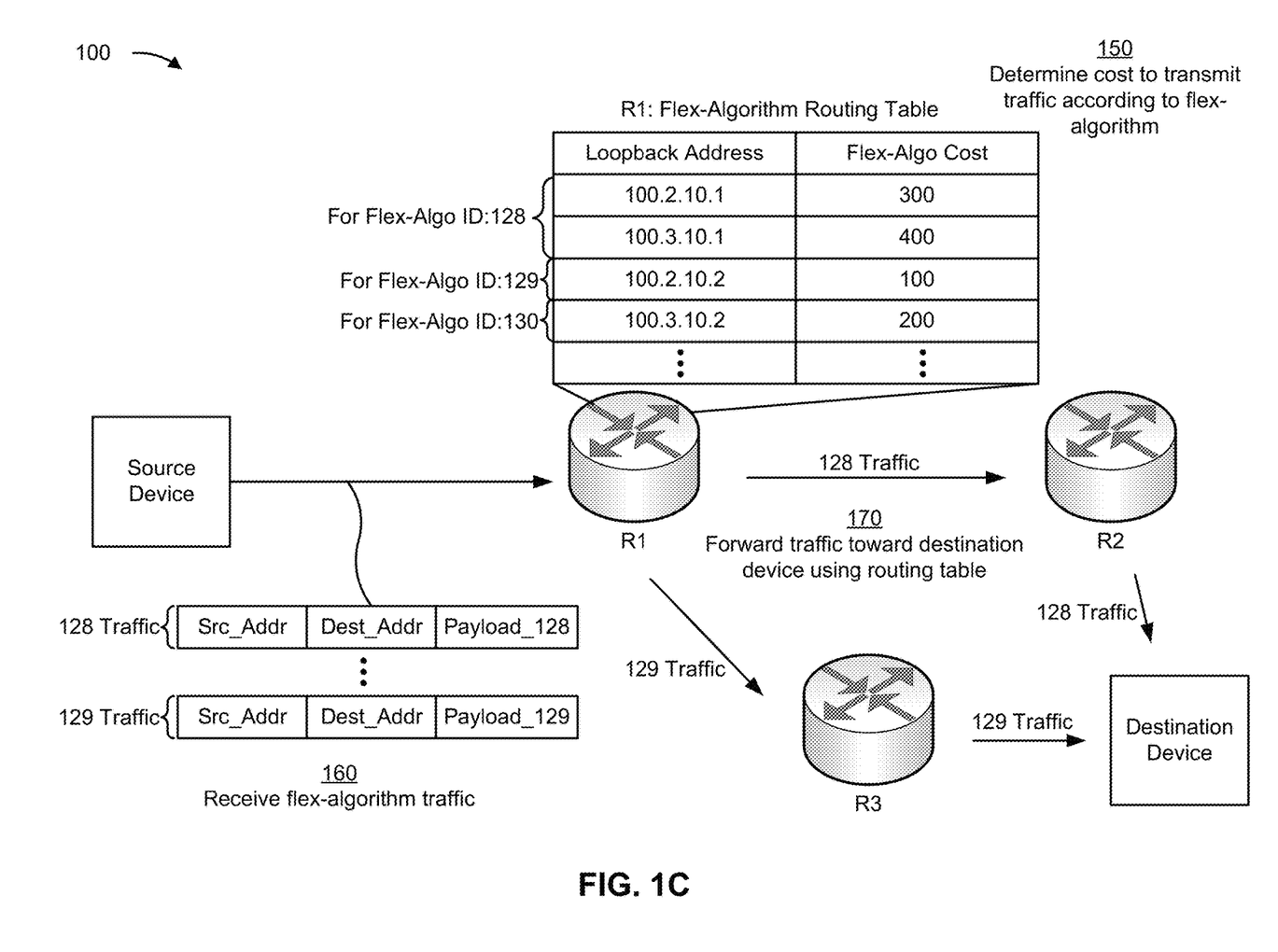

FIGS. 1A-1C are diagrams of an example 100 associated with a configuration of a non-segment-routing network that uses a flex-algorithm routing mechanism. As shown in FIGS. 1A-1C, example 100 includes a set of network devices (shown as and referred to individually in connection with example 100 as "R1," "R2," and "R3," and collectively as the "network devices") of a network, a source device, and a destination device. The network devices may be peer nodes of the network. In some implementations, R1 is a neighbor node of R2 and R3. The source device and the destination device may be user devices and/or network devices.

As shown in FIG. 1A, and by reference number 110, R1 receives link information from R2 and R3. For example, R2 and/or R3 may use an intermediate system to intermediate system (IS-IS) routing protocol and/or an open shortest path first (OSPF) routing protocol to advertise information associated with R2 and/or R3 and/or link information associated with links to which R2 and/or R3 are connected. The link information for a link may include one or more metrics for calculating a least cost path (e.g., an IGP metric, a traffic engineering (TE) metric, a minimum unidirectional link delay metric, and/or the like), information identifying an administrative group (e.g., a low latency group that includes links associated with low latencies, a high latency group, a low bandwidth group, a high bandwidth group, and/or the like) associated with the link, and/or the like.

As shown by reference number 120, R1 configures a link state data structure (e.g., a database, a table, a list, and/or the like) based on the link information received from R2 and/or R3. R1 may utilize the information stored in the link state data structure to calculate a cost associated with transmitting a packet from R1 to R2, from R1 to R3, from R2 to R3, and/or the like. R1 may utilize the calculated costs to determine a least cost path for transmitting traffic through the network.

As shown in FIG. 1B, and by reference number 130, R1 receives flex-algorithm advertisements from R2 and R3. For example, R2 and/or R3 may utilize the IS-IS routing protocol, the OSPF routing protocol, and/or the like to advertise one or more flex-algorithm definitions and/or links associated with a particular flex-algorithm. A flex-algorithm definition may include a Flex-Algo ID associated with the flex-algorithm definition, information identifying a type of metric (e.g., an IGP metric, a TE metric, a minimum unidirectional link delay metric, and/or the like) associated with calculating a least cost path, information identifying a calculation type (e.g., shortest path first (SPF), strict SPF, and/or the like) associated with calculating a least cost path, and/or information identifying one or more constraints associated with calculating a least cost path (e.g., include all administrative groups, exclude links associated with a particular administrative group, only include links associated with a particular administrative group, and/or the like).

In some implementations, the advertisement from R2 includes Flex-Algo IDs of the flex-algorithm definitions used by R2 and corresponding addresses through which R2 is to receive traffic associated with the respective flex-algorithm definitions. Similarly, the advertisement from R3 may include Flex-Algo IDs of the flex-algorithm definitions used by R3 and corresponding addresses through which R3 is to receive traffic associated with the respective flex-algorithm definitions.

As shown more specifically, R2 may be configured to receive traffic associated with a flex-algorithm definition identified by Flex-Algo ID "128" via an address interface identified by address "100.2.10.1" and may receive traffic associated with a flex-algorithm definition identified by Flex-Algo ID "129" via an address interface identified by address "100.2.10.2." Furthermore, R3 may be configured to receive traffic associated with a flex-algorithm definition identified by Flex-Algo ID "128" via an address interface identified by address "100.3.10.1" and may receive traffic associated with a flex-algorithm definition identified by Flex-Algo ID "128" via an address interface identified by address "100.3.10.2." In this way, R1 may receive flex-algorithm advertisements from R2 and R3 to permit R1 to configure a routing table for non-segment routing of flex-algorithm traffic through the network.

In some implementations, the corresponding addresses through which R2 and/or R3 are to receive traffic associated with the respective flex-algorithm definitions comprise loopback addresses. A loopback address may correspond to a software loopback interface of a network interface card (e.g., a network interface card of R2 and/or R3). The software loopback interface may not be associated with hardware and may not require a physical connection to the network.

As further shown in FIG. 1B, and by reference number 140, R1 configures a flex-algorithm table based on the received flex-algorithm advertisements. As shown, the flex-algorithm table maps Flex-Algo IDs to corresponding addresses associated with R2 and R3.

According to some implementations, and as shown in example 100, R1 may be configured to use flex-algorithms identified by Flex-Algo IDs "128," "129," and "130." In some implementations, R1 may only include entries for Flex-Algo IDs in the table that are associated with flex-algorithms that R1 is configured to support for routing traffic via the network. For example, if R1 were not configured to route traffic according to the flex-algorithm identified by Flex-Algo ID "129," R1 may not add an entry according to the advertisement from R2 that identifies Flex-Algo ID "129" and address "100.2.10.2." In this way, R1 configures a flex-algorithm routing table for routing of flex-algorithm traffic, in a non-segment-routing network, using addresses of R2 and R3.

As shown in FIG. 1C, and by reference number 150, R1 determines a cost associated with links to the addresses of R2 and R3 according to corresponding flex-algorithms of the addresses. For example, R1 may use an IGP metric, a TE metric, and/or the like to determine the costs. Additionally, or alternatively, R1 may determine the costs based on one or more parameters, constraints, and/or the like of the flex-algorithms. R1 may determine a cost associated with links to the addresses of R2 and R3 for each flex-algorithm. In this way, R1 may determine costs of routing traffic associated with the individual flex-algorithms to R2 and R3, to permit R1 to use the flex-algorithms for non-segment routing.

As further shown in FIG. 1C, and by reference number 160, R1 receives flex-algorithm traffic that identifies a destination address (shown as "Dest_Addr") of the destination device. The flex-algorithm traffic is to be transmitted from the source device to the destination device. Accordingly, the traffic may include a first packet (shown as "128 traffic," which may be associated with Flex-Algo ID "128") with a source address (shown as "Src_Addr") of the source device, the destination address of the destination device, and a payload (shown as "Payload_128"). Further, the traffic may include a second packet (shown as "128 traffic," which may be associated with Flex-Algo ID "129") with the source address, the destination address, and a payload (shown as "Payload_129"). In this way, R1 receives flex-algorithm traffic, to permit R1 to route the traffic to R2 and/or R3 using the flex-algorithm routing table.

As further shown in FIG. 1C, and by reference number 170, R1 forwards the traffic toward the destination device using the routing table. For example, R1 may forward the first packet toward the destination device via R2. R1 may have selected R2, rather than R3, for sending the first packet based on the cost of non-segment routing flex-algorithm traffic to R2 being less than the cost of non-segment routing traffic to R3 (e.g., "300"<"400"). As another example, R1 may forward the second packet toward the destination device via R3. R1 may have selected R3, for sending the second packet based on R3 being the only peer router on a path toward the destination device that processes flex-algorithm traffic identified by Flex-Algo ID "129."

Alternatively, and/or additionally, R1 may forward the second packet toward the destination device via R3 based on a constraint included in a flex-algorithm definition. For example, a constraint included in a flex-algorithm definition may indicate that links associated with an administrative group (e.g., Group 1, as shown in FIG. 1A) are to be excluded. R1 may forward the second packet toward the destination device via R3 based on the constraint indicating that the links associated with the administrative group are to be excluded. In this way, R1 may perform non-segment routing of flex-algorithm traffic using loopback addresses of R2 and R3 that are designated for specific flex-algorithms.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
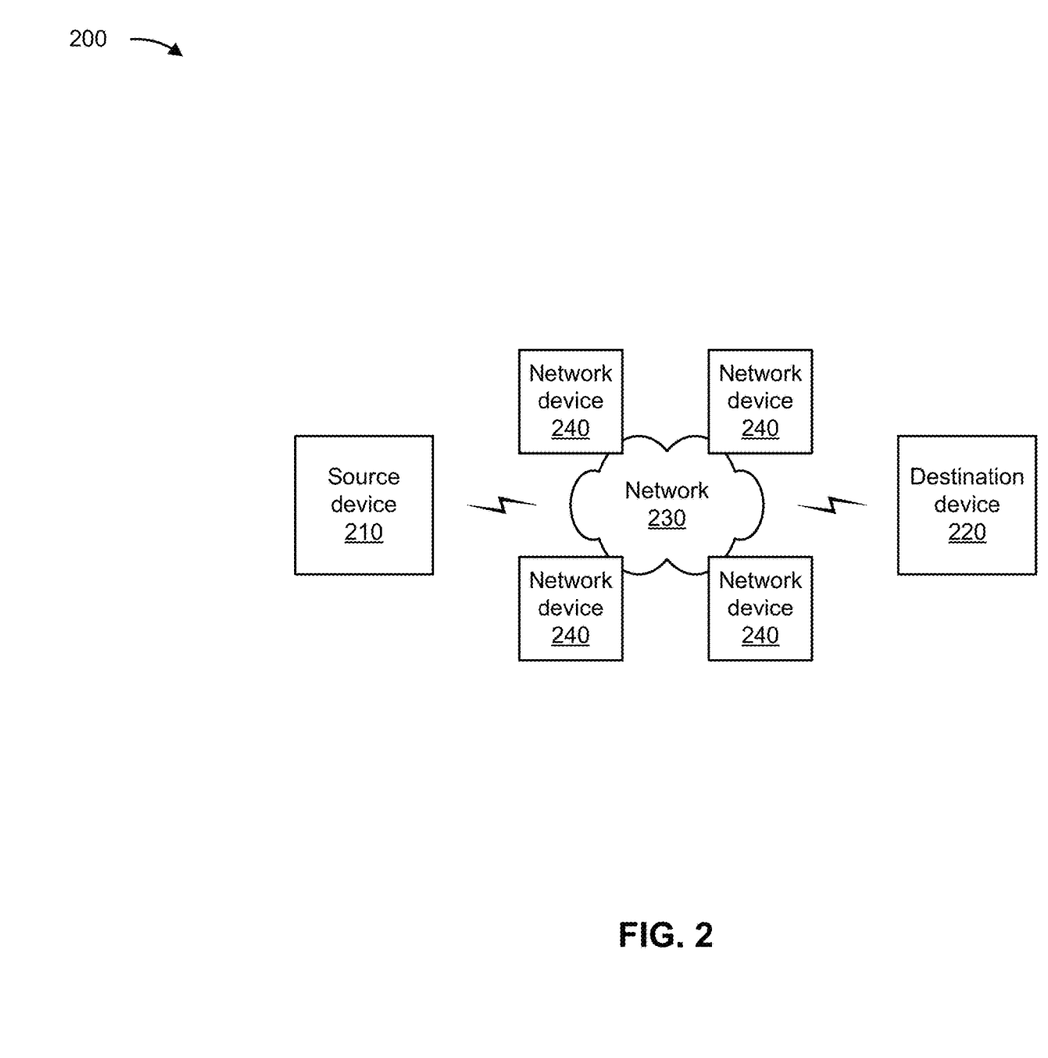
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a source device 210, a destination device 220, a network 230, and one or more network devices 240 (referred to herein individually as network device 240 or collectively as network devices 240). The devices of environment 200 may interconnect via wired connections, wireless connections, or a combination of wired and wireless connections.

The source device 210 and/or the destination device 220 may include one or more user devices. For example, the source device 210 and/or the destination device 220 may include one or more devices capable of receiving, generating, storing, processing, and/or providing network traffic associated with an application and/or a session, as described herein. The source device 210 and/or the destination device 220 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

In some implementations, the source device 210 and/or the destination device 220 may be a cloud-based platform of a cloud computing environment, a web-based platform, an online platform, and/or the like. In some implementations, the source device 210 and/or the destination device 220 include a network device, such as the network device 240, described in greater detail below.

The network 230 includes one or more wired and/or wireless networks. For example, the network 230 may include a cellular network (e.g., a long-term evolution (LTE) network, a code division multiple access (CDMA) network, a 2G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The network device 240 includes one or more devices (e.g., one or more traffic transfer devices) capable of processing and/or transferring traffic between endpoint devices (e.g., the source device 210 and the destination device 220). For example, network device 240 may include a firewall, a router, a gateway, a switch, a hub, a bridge, a reverse proxy, a server (e.g., a proxy server), a security device, an intrusion detection device, a load balancer, or a similar device. In some implementations, the network device 240 may be a physical device implemented within a housing, such as a chassis. In some implementations, the network device 240 may be a virtual device implemented by one or more computer devices of a cloud computing environment or a data center.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
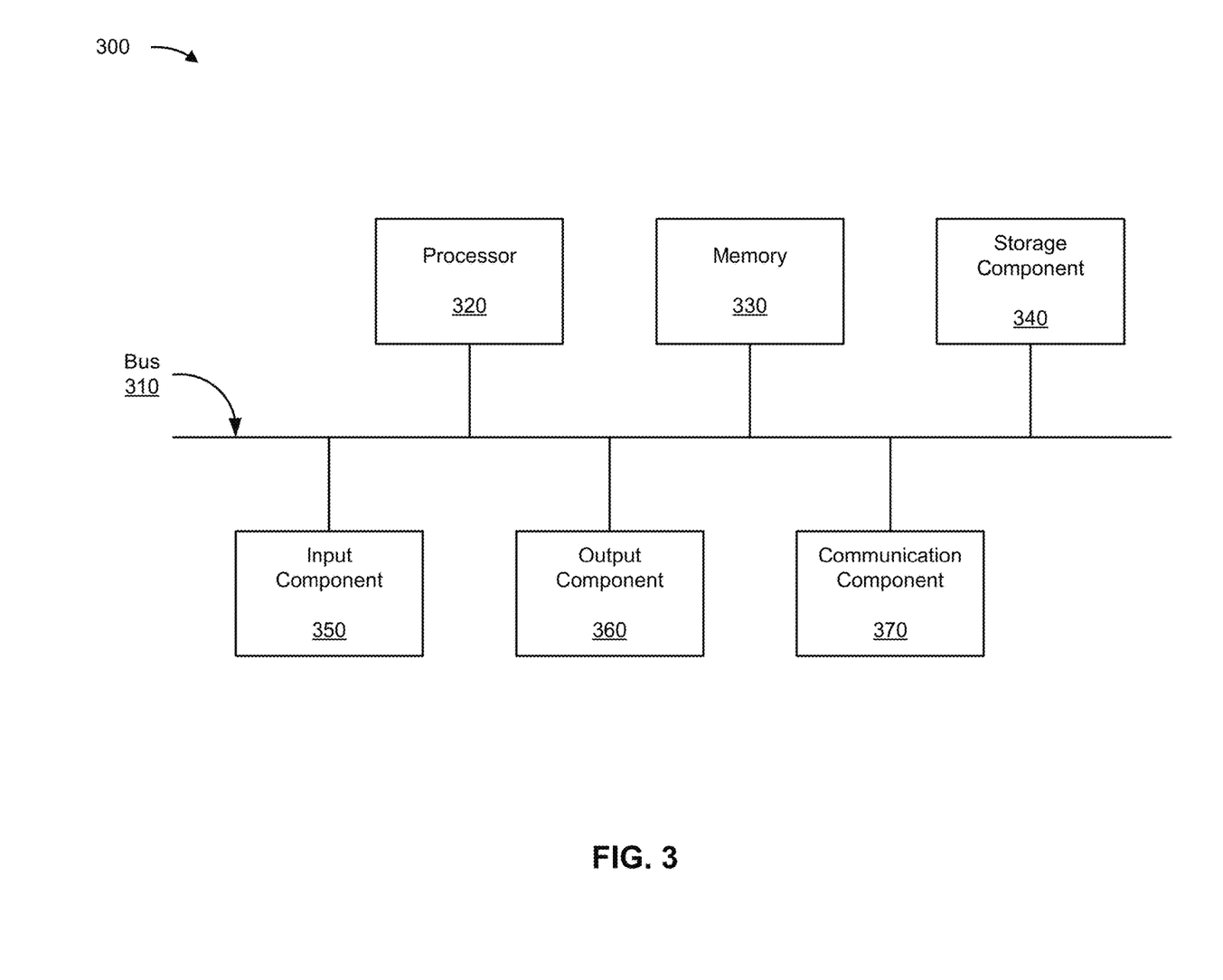
FIGS. 3-4 are diagrams of example components of one or more devices of FIG. 2.

FIG. 3 is a diagram of example components of a device 300, which may correspond to the source device 210, the destination device 220, and/or the network device 240. In some implementations, the source device 210, the destination device 220, and/or the network device 240 may include one or more devices 300 and/or one or more components of the device 300. As shown in FIG. 3, the device 300 may include a bus 310, a processor 320, a memory 330, a storage component 340, an input component 350, an output component 360, and a communication component 370.

The bus 310 includes a component that enables wired and/or wireless communication among the components of the device 300. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform a function. The memory 330 includes a random access memory, a read only memory, and/or another type of memory (e.g., a flash memory, a magnetic memory, and/or an optical memory).

The storage component 340 stores information and/or software related to the operation of the device 300. For example, the storage component 340 may include a hard disk drive, a magnetic disk drive, an optical disk drive, a solid state disk drive, a compact disc, a digital versatile disc, and/or another type of non-transitory computer-readable medium. The input component 350 enables the device 300 to receive input, such as user input and/or sensed inputs. For example, the input component 350 may include a touch screen, a keyboard, a keypad, a mouse, a button, a microphone, a switch, a sensor, a global positioning system component, an accelerometer, a gyroscope, an actuator, and/or the like. The output component 360 enables the device 300 to provide output, such as via a display, a speaker, and/or one or more light-emitting diodes. The communication component 370 enables the device 300 to communicate with other devices, such as via a wired connection and/or a wireless connection. For example, the communication component 370 may include a receiver, a transmitter, a transceiver, a modem, a network interface card, an antenna, and/or the like.

The device 300 may perform one or more processes described herein. For example, a non-transitory computer-readable medium (e.g., the memory 330 and/or the storage component 340) may store a set of instructions (e.g., one or more instructions, code, software code, program code, and/or the like) for execution by the processor 320. The processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
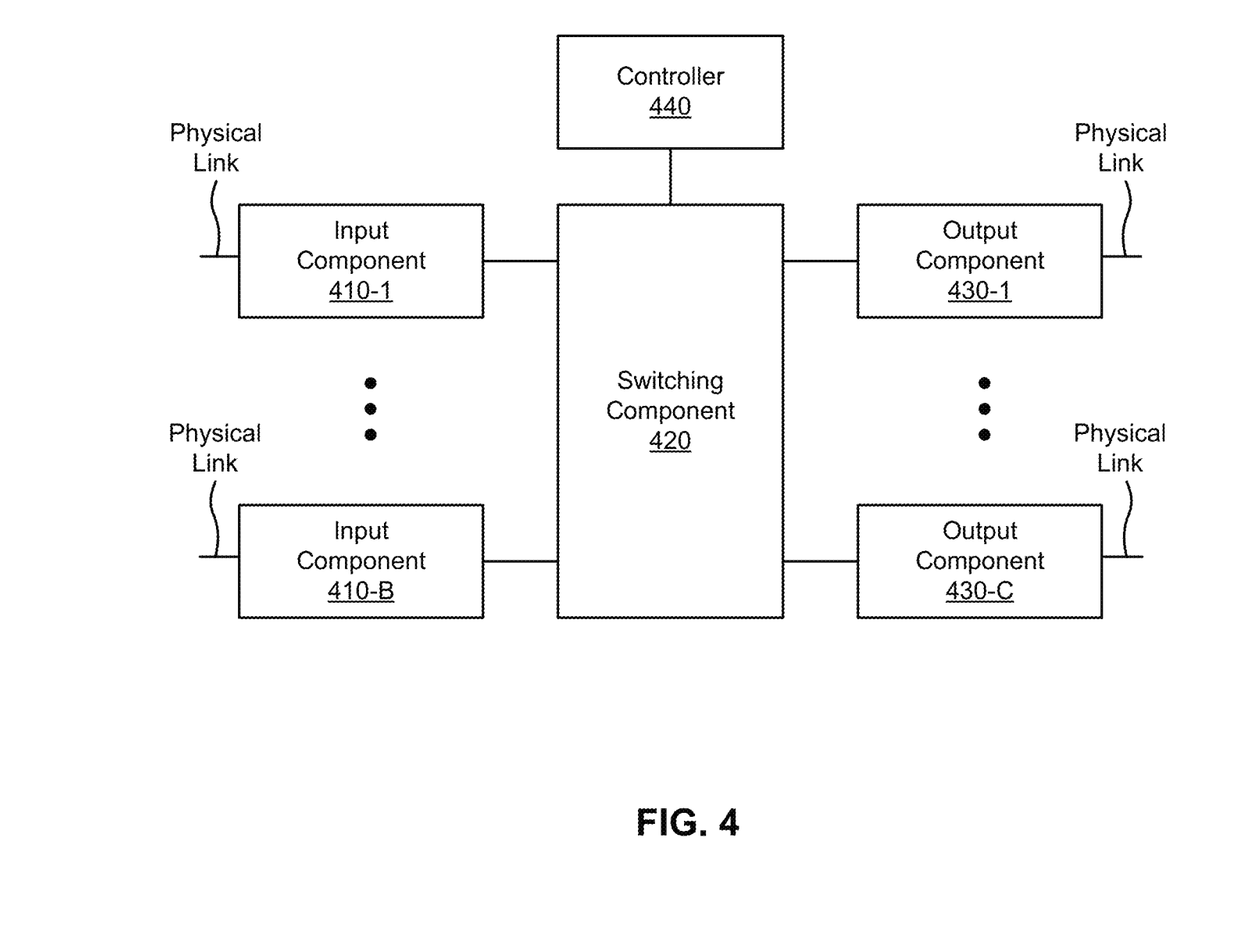

FIG. 4 is a diagram of example components of a device 400. The device 400 may correspond to the source device 210, the destination device 220, the network device 240, and/or the like. In some implementations, the source device 210, the destination device 220, the network device 240, and/or the like may include one or more devices 400 and/or one or more components of the device 400. As shown in FIG. 4, device 400 may include one or more input components 410-1 through 410-B (B≥1) (hereinafter referred to collectively as input components 410, and individually as the input component 410), a switching component 420, one or more output components 430-1 through 430-C (C≥1) (hereinafter referred to collectively as output components 430, and individually as the output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or the output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

The software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
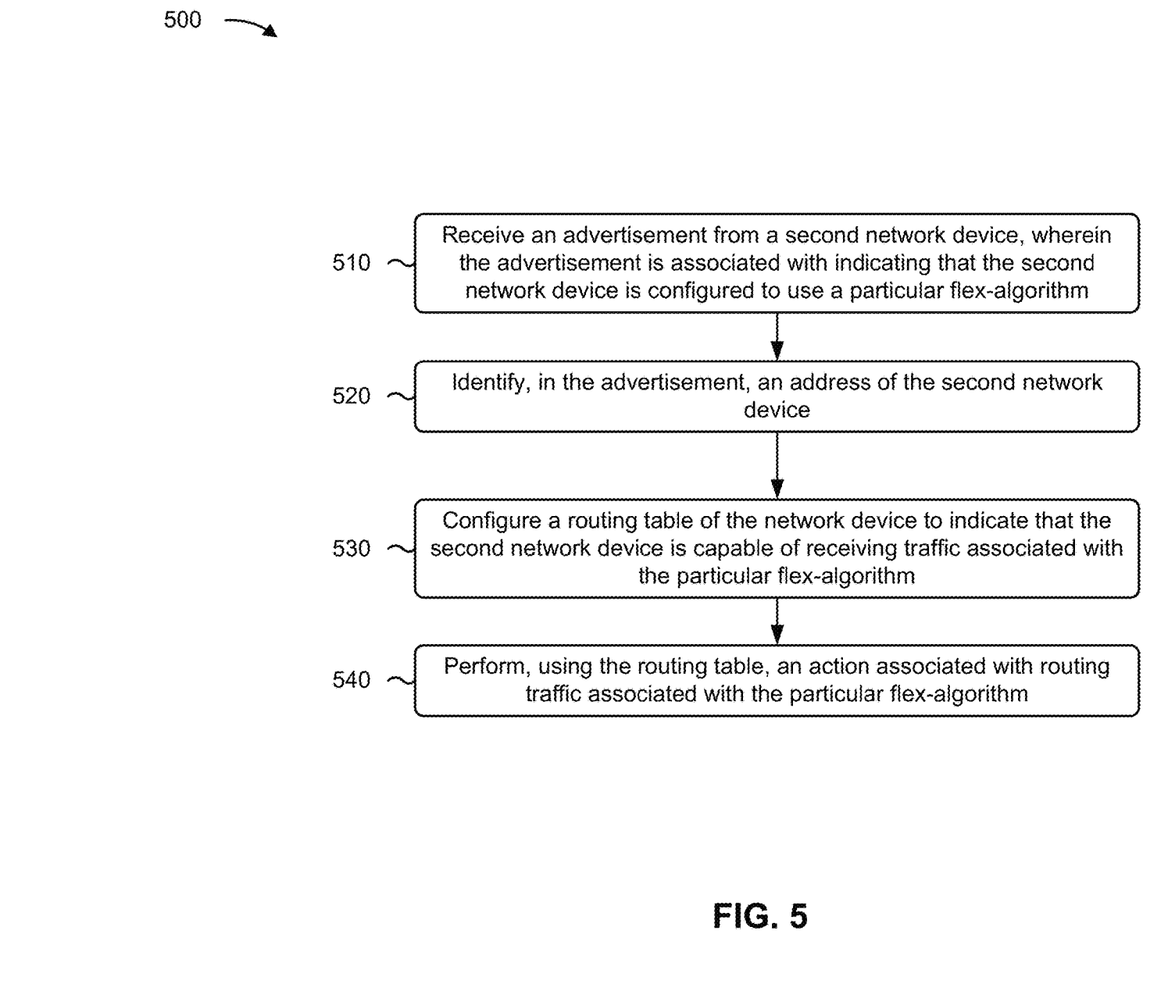
FIGS. 5-6 are flowcharts of example processes relating to configuration of a network using a flex-algorithm routing mechanism.

FIG. 5 is a flowchart of an example process 500 associated with a configuration of a network using a flex-algorithm routing mechanism. In some implementations, one or more process blocks of FIG. 5 may be performed by a network device (e.g., one or more network devices 240). In some implementations, one or more process blocks of FIG. 5 may be performed by another device or a group of devices separate from or including the network device, such as a source device (e.g., the source device 210) and/or a destination device (e.g., the destination device 220). Additionally, or alternatively, one or more process blocks of FIG. 5 may be performed by one or more components of device 300, such as the processor 320, the memory 330, the storage component 340, the input component 350, the output component 360, and/or the communication component 370.

As shown in FIG. 5, process 500 may include receiving an advertisement from a second network device, wherein the advertisement is associated with indicating that the second network device is configured to use a particular flex-algorithm (block 510). For example, the first network device may receive an advertisement from a second network device, as described above. In some implementations, the advertisement is associated with indicating that the second network device is configured to use a particular flex-algorithm. The first network device and/or the second network device may be included in a non-segment-routing network.

In some implementations, the first network device may provide a flex-algorithm definition to the second network device. The flex-algorithm definition may be associated with the particular flex-algorithm and the first network device may receive the advertisement based on providing the flex-algorithm definition to the second network device.

As further shown in FIG. 5, process 500 may include identifying, in the advertisement, an address of the second network device (block 520). For example, the first network device may identify, in the advertisement, an address of the second network device, as described above. The address may include a loopback address associated with the second network device.

As further shown in FIG. 5, process 500 may include configuring a routing table of the first network device to indicate that the second network device is capable of receiving traffic associated with the particular flex-algorithm (block 530). For example, the first network device may configure a routing table of the first network device to indicate that the second network device is capable of receiving traffic associated with the particular flex-algorithm, as described above.

As further shown in FIG. 5, process 500 may include performing, using the routing table, an action associated with routing traffic associated with the particular flex-algorithm (block 540). For example, the first network device may perform, using the routing table, an action associated with routing traffic associated with the particular flex-algorithm, as described above.

In some implementations, performing the action comprises the first network device transmitting, using the address, the traffic to the second network device based on at least one of a route path to the second network device having a least-cost according to the particular flex-algorithm, or the second network device being the only network device communicatively coupled to the first network device that is configured to use the particular flex-algorithm.

In some implementations, prior to performing the action, the first network device may determine a cost associated with routing the traffic to the second network device according to the flex-algorithm. The first network device may configure the routing table to indicate the cost in an entry that includes a mapping of the address. The action may be performed based on the cost.

In some implementations, the particular flex-algorithm is a first flex-algorithm and the address of the second network device is a first address. The first network device may receive another advertisement from the second network device. The other advertisement may be associated with indicating that the second network device is configured to support a second flex-algorithm. The first network device may identify, in the other advertisement, a second address (e.g., a second loopback address) of the second network device. The first network device may configure the routing table of the first network device to indicate that the second network device is capable of receiving traffic associated with the second flex-algorithm based on the second address. The first network device may perform, using the routing table, an action associated with routing the traffic associated with the second flex-algorithm.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
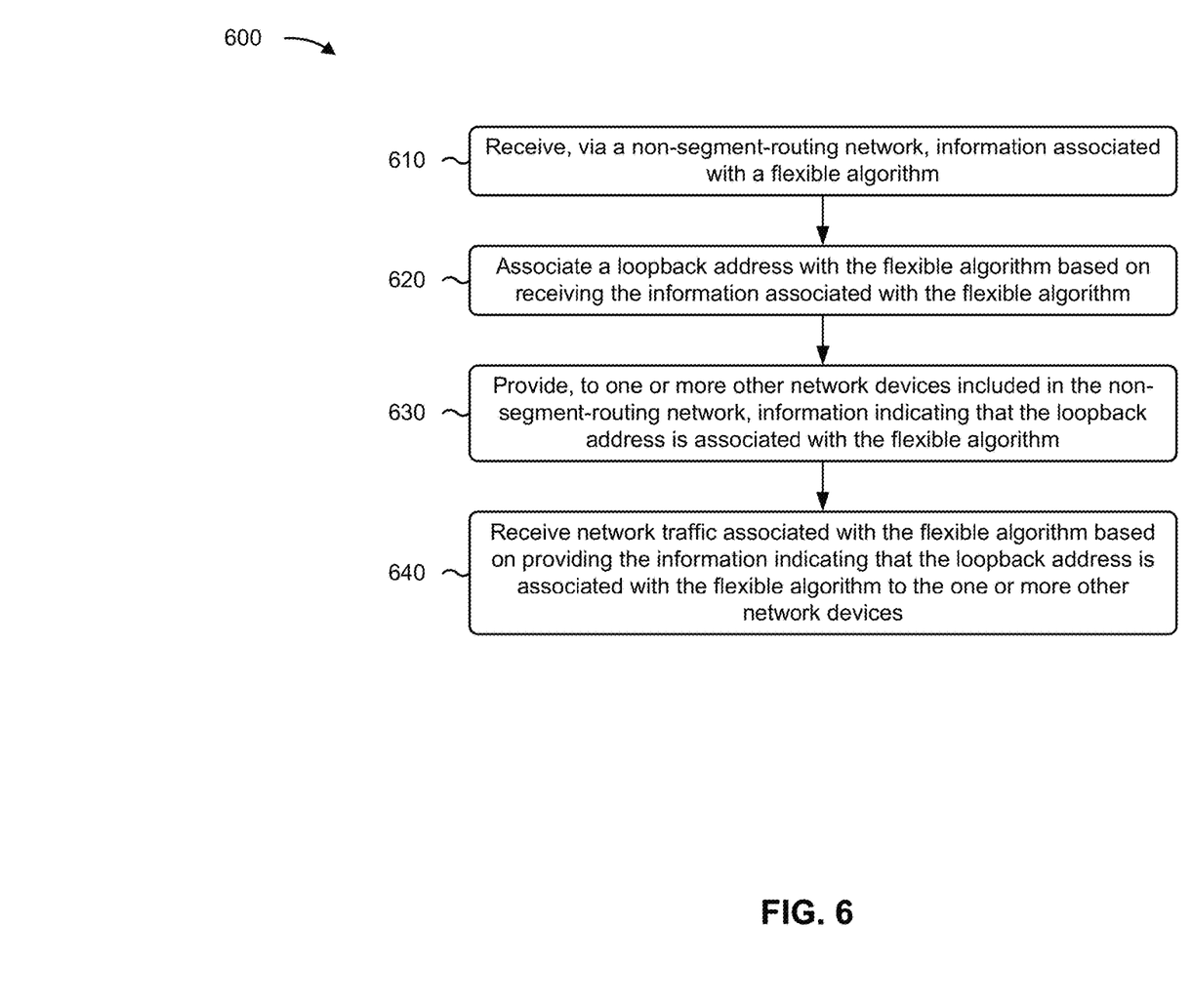

FIG. 6 is a flowchart of an example process 600 associated with configuration of a network using a flex-algorithm. In some implementations, one or more process blocks of FIG. 6 may be performed by a network device (e.g., one or more network devices 240). In some implementations, one or more process blocks of FIG. 6 may be performed by another device or a group of devices separate from or including the network device, such as a source device (e.g., the source device 210) and/or a destination device (e.g., the destination device 220). Additionally, or alternatively, one or more process blocks of FIG. 6 may be performed by one or more components of device 300, such as processor 320, memory 330, storage component 340, input component 350, output component 360, and/or communication component 370.

As shown in FIG. 6, process 600 may include receiving, via a non-segment-routing network, information associated with a flexible algorithm (block 610). For example, the network device may receive, via a non-segment-routing network, information associated with a flexible algorithm, as described above. In some implementations, the information associated with the flexible algorithm may include a flexible algorithm definition associated with the flexible algorithm. Alternatively, and/or additionally, the information associated with the flexible algorithm may include an identifier associated with the flexible algorithm, information identifying a metric associated with determining a least cost path for transmitting traffic associated with the flexible algorithm, information identifying a type of calculation associated with determining the least cost path, and/or information identifying a constraint associated with determining the least cost path. The metric may include an intermediate segment to intermediate segment metric, a traffic engineering metric, and/or a minimum unidirectional link delay metric. The type of calculation may include a shortest path first calculation and/or a strict shortest path first calculation.

As further shown in FIG. 6, process 600 may include associating a loopback address with the flexible algorithm based on receiving the information associated with the flexible algorithm (block 620). For example, the network device may associate a loopback address with the flexible algorithm based on receiving the information associated with the flexible algorithm, as described above.

As further shown in FIG. 6, process 600 may include providing, to one or more other network devices included in the non-segment-routing network, information indicating that the loopback address is associated with the flexible algorithm (block 630). For example, the network device may provide, to one or more other network devices included in the non-segment-routing network, information indicating that the loopback address is associated with the flexible algorithm, as described above.

As further shown in FIG. 6, process 600 may include receiving network traffic associated with the flexible algorithm based on providing the information indicating that the loopback address is associated with the flexible algorithm to the one or more other network devices (block 640). For example, the network device may receive network traffic associated with the flexible algorithm based on providing the information indicating that the loopback address is associated with the flexible algorithm to the one or more other network devices, as described above.

In some implementations, the network device may receive information associated with another flexible algorithm. The network device may associate another loopback address with the other flexible algorithm based on receiving the information associated with the other flexible algorithm. The network device may provide, to the one or more other network devices included in the non-segment-routing network, information indicating that the other loopback address is associated with the other flexible algorithm.

In some implementations, the network device may receive flexible algorithm information from the one or more other network devices. The flexible algorithm information may identify another flexible algorithm and another loopback address associated with another network device, of the one or more other network devices. The network device may calculate a least cost path associated with transmitting traffic to the other network device based on a metric, a type of calculation, and/or a constraint identified in a flex-algorithm definition associated with the other flexible algorithm. The traffic may be associated with the other flexible algorithm and the network device may transmit the traffic towards the other network device based on the least cost path.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   receiving, by a first network device, an advertisement from a second network device,
     wherein the advertisement is associated with indicating that the second network device is configured to support a particular flex-algorithm;
   identifying, by the first network device and using the advertisement, an address of the second network device; and
   performing, by the first network device, an action associated with routing traffic in a non-segment-routing network associated with the particular flex-algorithm based on the address.

2. The method of claim 1, wherein the second network device is capable of receiving traffic associated with the particular flex-algorithm based on the address.

3. The method of claim 1, wherein performing the action comprises:
   forwarding traffic toward the second network device using a routing table.

4. The method of claim 1, further comprising:
   determining a cost to transmit traffic according to the particular flex-algorithm.

5. The method of claim 1, wherein performing the action comprises:
   transmitting, using the address, the traffic to the second network device based on a route path to the second network device having a least-cost according to the particular flex-algorithm.

6. The method of claim 1, further comprising:
   transmitting, using the address, the traffic to the second network device based on the second network device.

7. The method of claim 1, wherein one or more of the first network device or the second network device are included in a non-segment-routing network.

8. A first network device, comprising:
   one or more processors to:
     receive, from a second network device, an advertisement associated with indicating that the second network device is configured to support a particular flex-algorithm; and
     perform an action associated with routing traffic in a non-segment-routing network associated with the particular flex-algorithm based on an address of the second network device.

9. The first network device of claim 8, wherein the one or more processors are further to:
   identify the address of the second network device using the advertisement.

10. The first network device of claim 8, wherein the second network device is capable of receiving traffic associated with the particular flex-algorithm based on the address.

11. The first network device of claim 8, wherein the one or more processors are further to:
    determine a cost to transmit traffic according to the particular flex-algorithm.

12. The first network device of claim 8, wherein the one or more processors, when performing the action, are to:
    transmit, using the address, the traffic to the second network device based on a route path to the second network device having a least-cost according to the particular flex-algorithm.

13. The first network device of claim 8, wherein the one or more processors, when performing the action, are to:
    transmit, using the address, the traffic to the second network device based on the second network device being communicatively coupled to the first network device that is configured to use the particular flex-algorithm.

14. The first network device of claim 8, wherein the address is a loopback address associated with the second network device.

15. A non-transitory computer-readable medium storing a set of instructions, the set of instructions comprising:
    one or more instructions that, when executed by one or more processors of a first network device, cause the first network device to:
      receive, from a second network device, an advertisement associated with indicating that the second network device is configured to support a particular flex-algorithm; and
      perform an action associated with routing traffic in a non-segment-routing network associated with a destination device based on the particular flex-algorithm and an address of the second network device.

16. The non-transitory computer readable medium of claim 15, wherein the one or more instructions further cause the first network device to:
    receive another advertisement from the second network device,
      wherein the other advertisement is associated with indicating that the second network device is configured to support a second flex-algorithm;
    configure a routing table of the first network device to indicate that the second network device is capable of receiving traffic associated with the second flex-algorithm based on a second address in the other advertisement; and
    perform, using the routing table, an action associated with routing the traffic associated with the second flex-algorithm.

17. The non-transitory computer readable medium of claim 15, wherein the first network device and the second network device are included in a non-segment-routing network.

18. The non-transitory computer readable medium of claim 15, wherein the one or more instructions further cause the first network device to:
provide a flex-algorithm definition to the second network device,
wherein the flex-algorithm definition is associated with the particular flex-algorithm, and
wherein the first network device receives the advertisement based on providing the flex-algorithm definition to the second network device.

19. The non-transitory computer readable medium of claim 15, wherein the one or more instructions, that cause the first network device to perform the action, cause the first network device to:
forward traffic toward the second network device using a routing table.

20. The non-transitory computer readable medium of claim 15, wherein the one or more instructions further cause the first network device to:
determine a cost to transmit traffic according to the particular flex-algorithm.

\* \* \* \* \*